Dec. 23, 1947. H. F. MALM 2,433,229
UTILITY TRAILER
Filed May 31, 1946 2 Sheets-Sheet 1
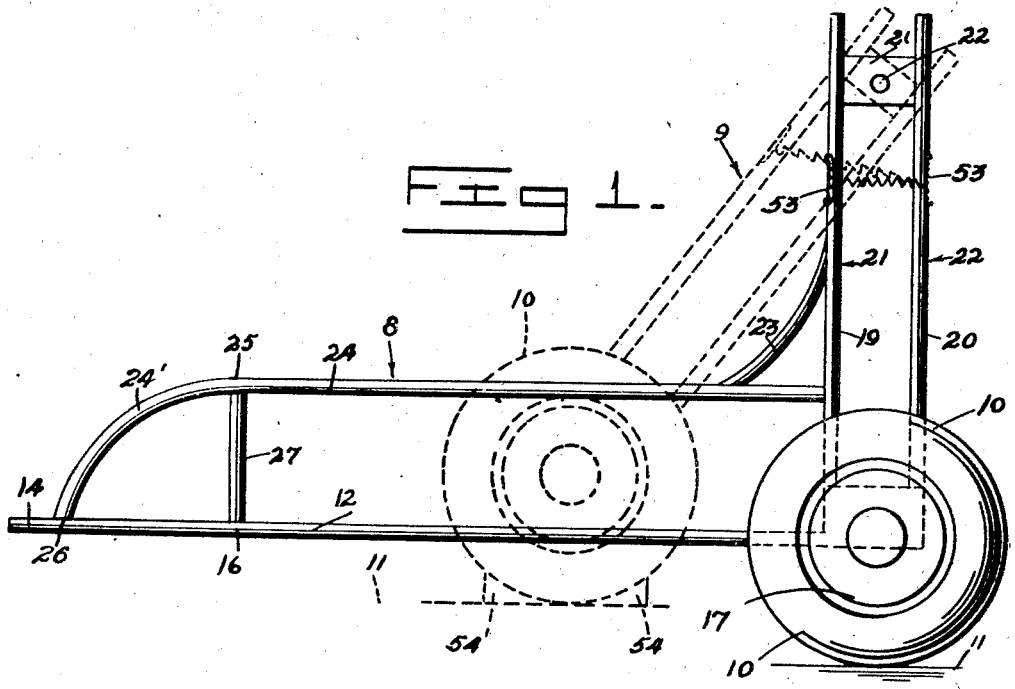
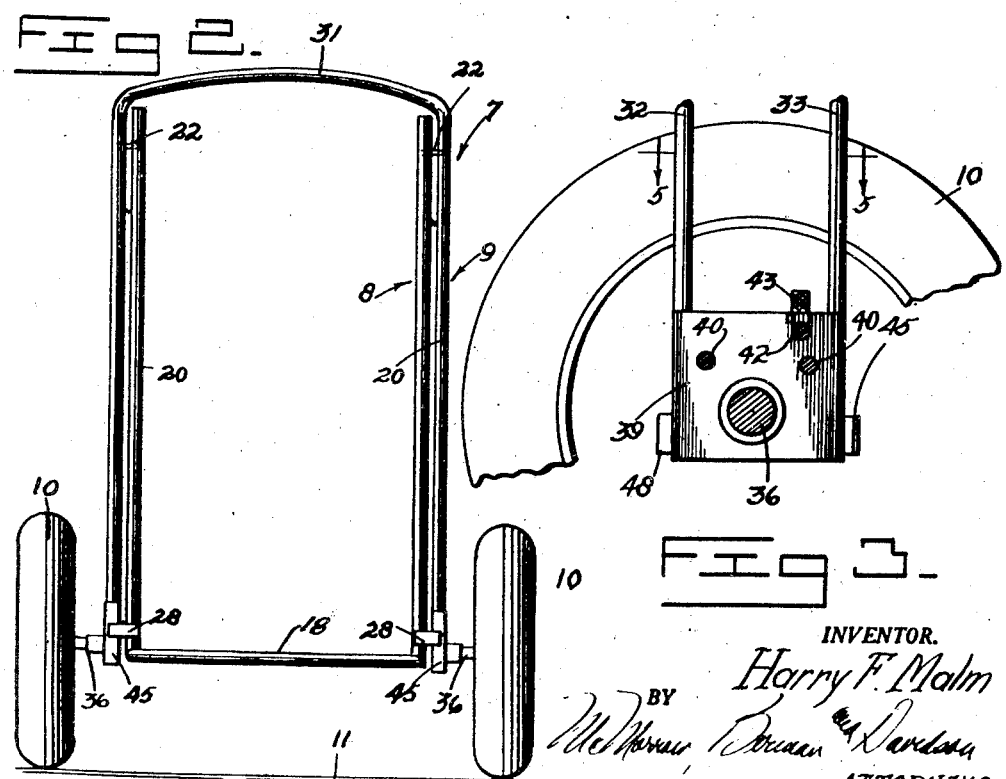
INVENTOR.
Harry F. Malm
BY
ATTORNEYS Dec. 23, 1947. H. F. MALM 2,433,229
UTILITY TRAILER
Filed May 31, 1946 2 Sheets-Sheet 2
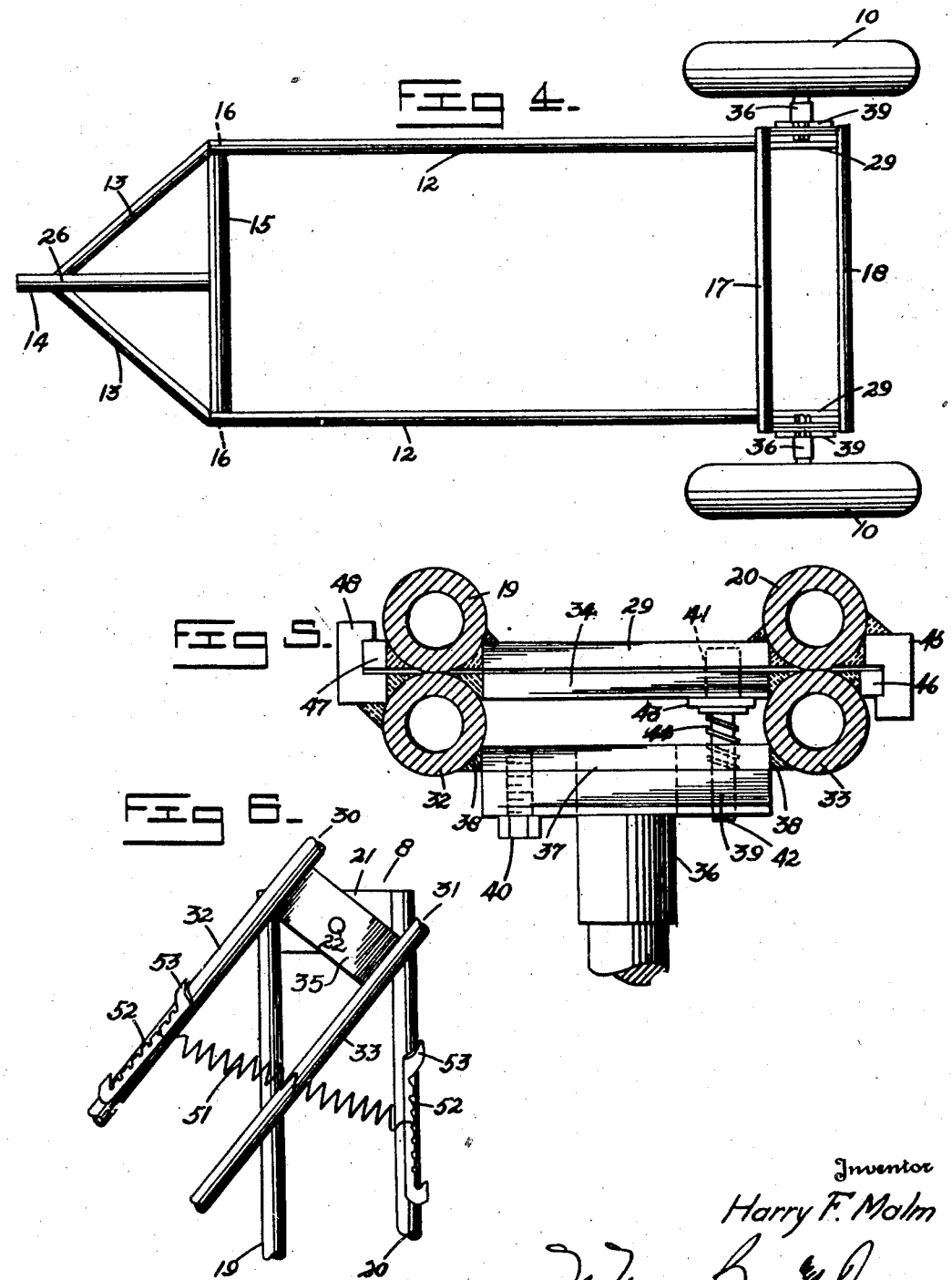
Inventor
Harry F. Malm Patented Dec. 23, 1947

2,433,229

UNITED STATES PATENT OFFICE 2,433,229

UTILITY TRAILER

Harry F. Malm, Portland, Oreg.

Application May 31, 1946, Serial No. 673,236

6 Claims. (Cl. 280—33.4)

My invention relates generally to improvements in two-wheeled utility trailers having adaptability for a number of different handling and hauling jobs, especially the carrying of boats and other relatively large and heavy objects; and my invention more particularly has for a primary object the provision of a convertible utility trailer composed of inner and outer wheeled and non-wheeled frames pivotally connected to each other so that the frames can be tilted relative to each other so as to displace the wheels forwardly and to place the rear end of the non-wheeled frame at ground level by backing the tractor so as to facilitate loading and discharge and other operations involving backing up of the trailer to perform work, which frames can be restored to their normal positions by pulling the tractor forwardly.

Other important objects and advantages of my invention will be apparent from the following description and the accompanying drawings, wherein for the purpose of illustration only, a preferred embodiment of my invention is set forth in detail.

In the drawings:

Figure 1 is a side elevation of the trailer, showing in phantom lines a tilted position of the outer frame and the use of chocks under its wheels in such position.

Figure 2 is a rear end elevation.

Figure 3 is a fragmentary sectional and elevational view showing the outer side of a means for supporting the trailer wheels and for releasably locking the frames in their normal positions.

Figure 4 is a bottom plan view of the trailer with the frames in normal position.

Figure 5 is a horizontal section taken on the line 5—5 of Figure 3, and

Figure 6 is a fragmentary side elevation on a somewhat enlarged scale showing the upper part of the frames in relatively tilted positions.

Referring in detail to the drawings, the trailer, which is generally designated 7, is composed of the inner frame 8 and the outer frame 9, the wheels 10 being mounted on the outer frame 9 to support the trailer upon the ground surface 11. The frames are preferably made up of welded pipe or rod material, and the wheels 10 are preferably of the pneumatic-tired type.

The inner frame 8 comprises two substantially parallel generally horizontal side members 12, converged at their forward parts at 13 to join a centralized draft tongue 14, which extends rearwardly and connects with the cross member 15, which is connected to and between the side members 12 at the points 16.

The rear ends of the side members 12 are spaced and connected at their rear ends by longitudinally spaced cross members 17 and 18, from each outer end of which rise perpendicularly the standards 19 and 20 which are connected at their upper ends by plates 21 carrying laterally outwardly projecting pivots 22.

Generally parallelly spaced above the inner frame lower side members 12 are upper side members 24 which are connected at their rear ends to the forward standard 19, and have their front ends 24' inwardly deflected downwardly and inwardly from the points 25 to connect with the tongue 14 at the point 26. Vertical braces 27 connect the points 16 and 25 of the lower and upper side members 12 and 24, respectively, and curved diagonal braces 23 connect the standards 19 and the upper members 24.

The lower part of the rear standards 20 have laterally inwardly projecting stop lugs 28 to stop the outer frame 9 in erect position upon its being returned from a tilted position, and the lower ends of the standards 19 and 20 have their lower ends connected by horizontal plates 29, as indicated in Figure 5.

The outer frame 9 comprises spaced forward and rearward inverted U-shaped members 30 and 31, respectively, having their corresponding legs 32 and 33 at opposite sides connected by plates 34. Upper plates 35 are connected between the legs 32 and 33 opposite the inner frame plates 21, and the pivots 22 traverse the plates 35 so as to pivotally connect the inner and outer frames 8 and 9 for tilting relative to each other.

The trailer wheels 10 are journalled on horizontal stub axles 36 formed on plates 37 which are welded at 38 to and between the outer frame uprights 32 and 33, as shown in Figure 5. The stub axles 36 pass through outer plates 39 mounted on the plates 37 by horizontal bolts 40.

A latch bolt 41 penetrates registered receiving openings provided in the plates 29 and 34 and includes a pin 42 penetrating registered openings provided in the plates 37 and 39. The latch bolt 41 has a retracting handle 43, and an extending spring 44 on the pin 39 and compressed between the handle 43 and the plate 37. The latch bolt 41 is adapted to be retracted out of the openings in the plates 29 and 34, by pulling outwardly on the handle 43 against the resistance of the spring 44.

An outwardly projecting hook flange 45 welded on the rearward standard 20 of the inner frame 8 is arranged to be engaged by an abutment 46 welded to the rearward upright 33 of the outer frame 9; and a similar but reversely positioned abutment 47 and hook flange 48 are welded on the forward inner frame standard 19 and the forward outer frame upright 32, respectively, so that when the latch bolt 41 is retracted the outer frame 9 can swing forwardly relative to the inner frame 8, and when swung back, will be stopped with the latch bolt 41 aligned with the receiving openings in the plates 29 and 34, so that the latch bolt 41 can spring into locking position.

As indicated in Figure 3, the plates 39 are located below the plates 29, 34 and 37. It will also be observed that the bight portions 49 and 50 of the inverted U-shaped frame members 30 and 31 of the outer frame 9 reach above the upper ends of the uprights of the inner frame 8 to provide ample clearance with the latter when the frames 8 and 9 are swung relative to each other.

For balancing the weight of the inner frame 8 in tilted positions of the frames 8 and 9 one or more biasing springs 51 are stretched between the outer frame front uprights 32 and the inner frame rear standards 20, as shown in Figure 6, with the hooked ends of the springs 51 selectively engaged with vertically spaced notches 52 formed in fittings 53 secured to the front and rear, respectively, of the last mentioned standards 20 below the pivot 22.

In operation, and with the inner and outer frames 8 and 9 in their normal positions and locked together by the latch bolt 41, the trailer is adapted to be drawn forward or backed by means of a vehicle attached to the draft tongue 14, and otherwise operated as an ordinary trailer.

However, when occasion presents to load upon and between the side members 12 of the inner frame 8 an object too heavy or cumbersome to lift and place thereon such as a boat, the rear end of the inner frame 8 may be brought down to the level of the ground surface 11, by placing chocks 54 in front of and behind the wheels 10 to hold their positions on the ground surface, retracting the latch bolts 41, and then backing the tractor vehicle (not shown), thereby tilting the frames 8 and 9 relative to each other so that the inner frame 8 moves rearwardly and downwardly relative to the outer frame 9, as indicated in Figure 1. The end of the boat or other object to be loaded having been aligned with the rear end of the inner frame 8, the shovelling action produced by the downward and rearward movement of the rear end of the inner frame 8 will lift the said end of the boat into and upon the inner frame 8, and facilitate the boat's being pushed onto said frame 8 or the boat's being pushed all the way onto said frame 8 by backing the trailer further, with the wheel chocks 54 removed.

When loading has been accomplished as outlined above, the wheel chocks 54 are restored in position and the trailer pulled forward so that, with the aid of the balancing springs 51, the outer frame 9 swings rearwardly on the pivots 22 until the stop flanges 45 and 48 engage their related abutments 46 and 47, respectively, whereupon the latch bolts 41 move automatically into position so as to lock the frames 8 and 9 together in their normal positions, as a result of which the trailer with its load is ready to be drawn to its destination. Unloading of the trailer is accomplished by a reversal of the above described operations.

I claim:

1. A utility trailer, comprising inner and outer frames, said inner frame comprising a generally horizontal load carrying portion and laterally spaced uprights rising thereabove, a draft tongue on the forward part of said load carrying portion, said outer frame comprising a pair of laterally spaced uprights positioned outside of said inner frame uprights, means pivoting upper parts of the uprights of the inner frame to upper parts of the uprights of the outer frame so that said outer frame can swing forwardly relative to said inner frame and said inner frame can swing rearwardly and downwardly on a transverse axis elevated above said horizontal load carrying portion of the inner frame so as to engage the rear end with the ground, ground engaging wheels on the lower parts of said outer frame uprights for supporting said load carrying portion above the ground in the normal non-tilted relation of said frames, and releasable locking means for locking said frames in said normal relation.

2. A utility trailer, comprising inner and outer frames, said inner frame comprising a generally horizontal load carrying portion and laterally spaced uprights rising thereabove, a draft tongue on the forward part of said load carrying portion, said outer frame comprising a pair of laterally spaced uprights positioned outside of said inner frame uprights, means pivoting upper parts of the uprights of the inner frame to upper parts of the uprights of the outer frame so that said outer frame can swing forwardly relative to said inner frame and said inner frame can swing rearwardly and downwardly on a transverse axis elevated above said horizontal load carrying portion of the inner frame so as to engage the rear end with the ground, ground engaging wheels on the lower parts of said outer frame uprights for supporting said load carrying portion above the ground in the normal non-tilted relation of said frames, and releasable locking means for locking said frames in said normal relation, said uprights of said inner frame rising from the rear end of said load carrying portion.

3. A utility trailer, comprising inner and outer frames, said inner frame comprising a generally horizontal load carrying portion and laterally spaced uprights rising thereabove, a draft tongue on the forward part of said load carrying portion, said outer frame comprising a pair of laterally spaced uprights positioned outside of said inner frame uprights, means pivoting upper parts of the uprights of the inner frame to upper parts of the uprights of the outer frame so that said outer frame can swing forwardly relative to said inner frame and said inner frame can swing rearwardly and downwardly on a transverse axis elevated above said horizontal load carrying portion of the inner frame so as to engage the rear end with the ground, ground engaging wheels on the lower parts of said outer frame uprights for supporting said load carrying portion above the ground in the normal non-tilted relation of said frames, and releasable locking means for locking said frames in said normal relation, said uprights of said outer frame being connected together at their upper ends by an element reaching over the upper ends of the inner frame uprights.

4. A utility trailer, comprising inner and outer frames, said inner frame comprising a generally horizontal load carrying portion and laterally spaced uprights rising thereabove, a draft tongue on the forward part of said load carrying portion, said outer frame comprising a pair of laterally spaced uprights positioned outside of said inner frame uprights, means pivoting upper parts of the uprights of the inner frame to upper parts of the uprights of the outer frame so that said outer frame can swing forwardly relative to said inner frame and said inner frame can swing rearwardly and downwardly on a transverse axis elevated above said horizontal load carrying portion of the inner frame so as to engage the rear end with the ground, ground engaging wheels on the lower parts of said outer frame uprights for supporting said load carrying portion above the ground in the normal non-tilted relation of said frames, releasable locking means for locking said frames in said normal relation, and balancing springs stretched between the inner and outer frame uprights at points below said pivot means for assisting in the return of said frames to normal non-tilted relation from a tilted relation.

5. A utility trailer, comprising inner and outer frames, said inner frame comprising a generally horizontal load carrying portion and laterally spaced uprights rising thereabove, a draft tongue on the forward part of said load carrying portion, said outer frame comprising a pair of laterally spaced uprights positioned outside of said inner frame uprights, means pivoting upper parts of the uprights of the inner frame to upper parts of the uprights of the outer frame so that said outer frame can swing forwardly relative to said inner frame and said inner frame can swing rearwardly and downwardly on a transverse axis elevated above said horizontal load carrying portion of the inner frame so as to engage the rear end with the ground, ground engaging wheels on the lower parts of said outer frame uprights for supporting said load carrying portion above the ground in the normal non-tilted relation of said frames, releasable locking means for locking said frames in said normal relation, and stop means on the inner frame uprights engageable by the outer frame uprights as said outer frame swings rearwardly toward a resumption of the normal relation of said frame so as to prevent overswinging of said outer frame in the return direction.

6. A utility trailer, comprising inner and outer frames, said inner frame comprising a generally horizontal load carrying portion and laterally spaced uprights rising thereabove, a draft tongue on the forward part of said load carrying portion, said outer frame comprising a pair of laterally spaced uprights positioned outside of said inner frame uprights, means pivoting upper parts of the uprights of the inner frame to upper parts of the uprights of the outer frame so that said outer frame can swing forwardly relative to said inner frame and said inner frame can swing rearwardly and downwardly on a transverse axis elevated above said horizontal load carrying portion of the inner frame so as to engage the rear end with the ground, ground engaging wheels on the lower parts of said outer frame uprights for supporting said load carrying portion above the ground in the normal non-tilted relation of said frames, releasable locking means for locking said frames in said normal relation, said locking means comprising plates on the adjacent inner and outer frame uprights, and a retractible spring-pressed latch bolt mounted on one of said plates and engageable with detent means on the other plate.

HARRY F. MALM.

REFERENCES CITED

The following references are of record in the file of this patent:

UNITED STATES PATENTS

| Number | Name | Date |
| --- | --- | --- |
| 542,067 | Sellers et al. | July 2, 1895 |
| 609,176 | Wolcott | Aug. 16, 1898 |
| 1,889,939 | Thomas | Dec. 6, 1932 |
| 2,042,598 | Harvey | June 2, 1936 |
| 2,147,696 | Gier | Feb. 21, 1939 |
| 2,199,392 | Dabrasky | May 7, 1940 |
| 2,209,312 | Rapp | July 30, 1940 |
| 2,294,110 | Donaldson | Aug. 25, 1942 |

FOREIGN PATENTS

| Number | Country | Date |
| --- | --- | --- |
| 33,978 | France | Oct. 23, 1928 |